United States Patent
Karthikeyan et al.

(10) Patent No.: US 10,554,578 B2
(45) Date of Patent: Feb. 4, 2020

(54) QUALITY OF SERVICE MANAGEMENT IN A NETWORK

(71) Applicant: BRITISH TELECOMMUNICATIONS PUBLIC LIMITED COMPANY, London (GB)

(72) Inventors: Vidhyalakshmi Karthikeyan, London (GB); Detlef Nauck, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 15/740,481

(22) PCT Filed: Jun. 30, 2016

(86) PCT No.: PCT/EP2016/065426
§ 371 (c)(1),
(2) Date: Dec. 28, 2017

(87) PCT Pub. No.: WO2017/001626
PCT Pub. Date: Jan. 5, 2017

(65) Prior Publication Data
US 2018/0191634 A1   Jul. 5, 2018

(30) Foreign Application Priority Data

Jun. 30, 2015 (EP) .................... 15275166
Sep. 28, 2015 (EP) .................... 15187163
(Continued)

(51) Int. Cl.
*H04L 12/927* (2013.01)
*H04L 29/08* (2006.01)
(Continued)

(52) U.S. Cl.
CPC ............ *H04L 47/805* (2013.01); *H04L 47/24* (2013.01); *H04L 67/322* (2013.01); *H04L 45/302* (2013.01); *H04L 67/306* (2013.01)

(58) Field of Classification Search
CPC ... H04L 47/805; H04L 45/302; H04L 67/322; H04L 47/24; H04L 67/306
See application file for complete search history.

(56) References Cited

U.S. PATENT DOCUMENTS 6,631,135 B1   10/2003   Wojcik
6,690,929 B1   2/2004    Yeh
(Continued)

FOREIGN PATENT DOCUMENTS

EP   1 016 261   7/2000
EP   1 374 486   1/2004
(Continued)

OTHER PUBLICATIONS

International Search Report and Written Opinion of the International Searching Authority dated Sep. 22, 2016 issued in International Application No. PCT/EP2016/065426 (14 pgs.).
(Continued)

*Primary Examiner* — Mohamed A Kamara
(74) *Attorney, Agent, or Firm* — Nixon & Vanderhye P.C.

(57) ABSTRACT

Method and systems for managing QoS models for traffic flows in a network are described. In particular, the method includes storing the QoS models and analyzing at least one of the QoS models to determine whether the QoS model satisfies a suitability test. One or more QoS models are then selected based on the analysis and these selected models are offered to a client for use with a traffic flow in the network. In one embodiment, the method may be implemented based on a query from a client requesting reservation of network resources for a traffic flow. The analysis may be based on a
(Continued)

characteristic of the or each QoS model, of the client, of a query received from the client requesting reservation of network resources for the traffic flow or of the network or an operator of the network.

20 Claims, 4 Drawing Sheets

(30) Foreign Application Priority Data

Sep. 30, 2015 (EP) .................................... 15187813
Mar. 24, 2016 (EP) .................................... 16162449

(51) Int. Cl.
*H04L 12/851* (2013.01)
*H04L 12/725* (2013.01)

(56) References Cited

U.S. PATENT DOCUMENTS

| | | | |
|---|---|---|---|
| 7,668,946 | B1 | 2/2010 | Garcia-Franco et al. |
| 7,715,312 | B2 | 5/2010 | Khasnabishi |
| 8,073,455 | B1 | 12/2011 | Xie et al. |
| 8,797,867 | B1* | 8/2014 | Chen ................... H04L 41/5022 370/232 |
| 2001/0013067 | A1 | 8/2001 | Koyanagi et al. |
| 2002/0174227 | A1* | 11/2002 | Hartsell .............. H04L 41/5022 709/226 |
| 2003/0112762 | A1 | 6/2003 | Hasan Mahmoud et al. |
| 2004/0120705 | A1 | 6/2004 | Friskney et al. |
| 2005/0083762 | A1 | 4/2005 | Rui et al. |
| 2005/0102414 | A1 | 5/2005 | Hares et al. |
| 2006/0029096 | A1 | 2/2006 | Babbar et al. |
| 2006/0187817 | A1 | 8/2006 | Charzinski et al. |
| 2007/0230363 | A1 | 10/2007 | Buskens et al. |
| 2007/0268827 | A1 | 11/2007 | Csaszar |
| 2008/0008091 | A1* | 1/2008 | Yumoto ................. H04L 47/15 370/230 |
| 2008/0065318 | A1 | 3/2008 | Ho |
| 2008/0232247 | A1 | 9/2008 | Evans |
| 2009/0245130 | A1* | 10/2009 | Bing ................... H04L 43/0894 370/253 |
| 2010/0100525 | A1* | 4/2010 | Huang ................... H04L 67/16 707/609 |
| 2010/0214920 | A1 | 8/2010 | Tewani et al. |
| 2010/0265826 | A1 | 10/2010 | Khasnabishi |
| 2011/0087522 | A1 | 4/2011 | Beaty et al. |
| 2011/0202405 | A1 | 8/2011 | Clark et al. |
| 2012/0087377 | A1 | 4/2012 | Lai |
| 2013/0144550 | A1 | 6/2013 | Czompo |
| 2013/0275567 | A1 | 10/2013 | Karthikeyan et al. |
| 2013/0275589 | A1 | 10/2013 | Karthikeyan et al. |
| 2013/0279521 | A1 | 10/2013 | Perez Martinez et al. |
| 2013/0311673 | A1 | 11/2013 | Karthikeyan |
| 2014/0046880 | A1 | 2/2014 | Breckenridge |
| 2014/0052850 | A1 | 2/2014 | Doorhy et al. |
| 2014/0057592 | A1 | 2/2014 | Chetlur et al. |
| 2015/0074283 | A1 | 3/2015 | Karthikeyan et al. |
| 2015/0098338 | A1 | 4/2015 | Bhattacharya |
| 2015/0295787 | A1 | 10/2015 | Kakadia et al. |
| 2015/0332155 | A1 | 11/2015 | Mermoud |
| 2015/0381648 | A1 | 12/2015 | Mathis |
| 2016/0171398 | A1 | 6/2016 | Eder |
| 2016/0344604 | A1 | 11/2016 | Raleigh |
| 2018/0191606 | A1 | 7/2018 | Karthikeyan et al. |
| 2018/0191621 | A1 | 7/2018 | Karthikeyan et al. |
| 2018/0191635 | A1 | 7/2018 | Karthikeyan et al. |

FOREIGN PATENT DOCUMENTS

| | | |
|---|---|---|
| EP | 1 401 161 | 3/2004 |
| EP | 1 453 256 | 8/2005 |
| EP | 1 248 431 | 10/2007 |
| EP | 1 993 231 | 11/2008 |
| EP | 2 151 951 | 2/2010 |
| EP | 2 261 811 | 12/2010 |
| EP | 2 469 756 | 6/2012 |
| EP | 1 875 693 | 8/2012 |
| WO | 99/14931 | 3/1999 |
| WO | 02/080458 A1 | 10/2002 |
| WO | 2006/116308 | 11/2006 |
| WO | 2008/068507 A2 | 6/2008 |
| WO | 2008/069507 | 6/2008 |
| WO | 2011/076282 | 6/2011 |
| WO | 2012/085520 | 6/2012 |
| WO | 2012/085521 | 6/2012 |
| WO | 2013/144550 | 10/2013 |
| WO | 2014/068268 | 5/2014 |
| WO | 2014/068270 | 5/2014 |
| WO | 2015/175260 A1 | 11/2015 |
| WO | 2017/001628 | 1/2017 |
| WO | 2017/001629 | 1/2017 |

OTHER PUBLICATIONS

Search Report dated Oct. 26, 2016 issued in GB1605188.0 (5 pgs.).
Zoubir Mammeri, "Principles and Mechanisms for Quality of Service in Networks", Chapter 2, Published Feb. 2, 2010 (33 pgs.).
Jari Koistinen and Aparna Seetharaman, "Worth-Based Multi-Category Quality-of-Service Negotiation in Distributed Object Infrastructures", Software Technology Laboratory, Hewlett Packard, Jul. 1998 (18 pgs.).
International Search Report for PCT/EP2016/065426 dated Sep. 22, 2016, 3 pages.
International Search Report of PCT/EP2016/065431, dated Sep. 23, 2016, (3 pages).
U.S. Appl. No. 15/740,832 filed Dec. 29, 2017 (29 pages).
International Search Report and Written Opinion issued in PCT/EP2016/065434 dated Oct. 6, 2016 (15 pages).
Valikannu "A Novel Energy Consumption Model using Residual Energy Based Mobile Agent Selection Scheme (REMA) in MANETs", 2015 $2^{nd}$International Conference on Signal Processing and Integrated Networks (SPIN), Noida, India. Pub., IEEE, Feb. 19-20, 2015 (6 pages).
GB Search Report issued in GB1517349.5, dated May 26, 2016 (6 pages).
Balaraman, "Business Data Mining and Decision Making Application of Data Mining in the Telecommunication Industry" Term paper, Quantitative Methods & Information Systems, Indian Institute of Management Bangalore, Oct. 22, 2011 (23 pages).
International Search Report and Written Opinion of PCT/EP2016/065429, dated Sep. 5, 2016 (16 pages).
Search Report dated Apr. 28, 2016 issued in GB1517110.1 (7 pages).
International Search Report and Written Opinion of the International Searching Authority dated Sep. 23, 2016, issued in International Application No. PCT/EP2016/065431 (15 pages).
U.S. Appl. No. 15/740,837 filed Dec. 29, 2017 (33 pages).
Extended European Search Report dated Nov. 26, 2015 issued in European Application No. 15275166.5 (5 pages).
Tanja Zseby and Sebastian Zander, "Sampling Schemes for Validating Service Level Agreements", Centre for Advanced Internet Architectures, CAIA Technical Report 040706A, Jul. 2004 (6 pages).
Zhengdong Gao and Gengfeng Wu, "Combining QoS-based Service Selection with Performance Prediction", School of Computer Engineering and Science, Shanghai University, Proceedings of the 2005 IEEE International Conference on e-Business Engineering (ICEBE'05); 2005 (4 pgs.).
U.S. Appl. No. 15/740,520 filed Dec. 28, 2017 (29 pages).
Office Action dated Apr. 19, 2019 issued in U.S. Appl. No. 15/740,837 (14 pages).
Office Action dated Oct. 17, 2018 issued in U.S. Appl. No. 15/740,837 (11 pages).
Advisory Action dated Aug. 2, 2019 issued in U.S. Appl. No. 15/740,837 (4 pages).

(56) References Cited

OTHER PUBLICATIONS

Office Action dated Apr. 19, 2019 issued in U.S. Appl. No. 15/740,832 (12 pages).
Office Action dated Oct. 17, 2018 issued in U.S. Appl. No. 15/740,832 (11 pages).
Office Action dated Nov. 2, 2018 issued in U.S. Appl. No. 15/740,520 (13 pages).
Office Action dated May 30, 2019 issued in U.S. Appl. No. 15/740,520 (16 pages).
Examination Report issued in EP Application No. 16 733 597.5 dated Sep. 12, 2019 (9 pages).
Ananya DAS "Maximizing Profit Using SLA-Aware Provisioning", 2012 IEEE Network Operations and Management Symposium (NOMS), Math & Computer Science Department, Lake Forest College, Apr. 16, 2012 (8 pages).
Office Action dated Nov. 13, 2019 issued in U.S. Appl. No. 15/740,832 (12 pgs.).
Office Action dated Nov. 13, 2019 issued in U.S. Appl. No. 15/740,837 (11 pgs.).
Advisory Action dated Oct. 8, 2019, issued in U.S. Appl. No. 15/740,520 (3 pages).

* cited by examiner

QUALITY OF SERVICE MANAGEMENT IN A NETWORK

This application is the U.S. national phase of International Application No. PCT/EP2016/065426 filed Jun. 30, 2016 which designated the U.S. and claims priority to EP Patent Application No. 15275166.5 filed Jun. 30, 2015, EP Patent Application No. 15187163.9 filed Sep. 28, 2015, EP Patent Application No. 15187813.9 filed Sep. 30, 2015 and EP Patent Application No. 16162449.9 filed Mar. 24, 2016, the entire contents of each of which are hereby incorporated by reference.

BACKGROUND AND SUMMARY

The present invention relates to the field of traffic routing, in particular the routing of packets and the provision of Quality of Service, QoS, for packets transmitted over a computer network.

As the volume of traffic transmitted on packet switched networks has increased, and the types of traffic transmitted over such networks has broadened to include traffic types that rely upon low latency transmission over the network, such as voice or streaming media, it has become increasingly important to enable proactive management of the traffic on the network.

Quality of service models have arisen to enable differentiated handling of different types of network traffic. The integrated services, Intserv, architecture is designed to guarantee a particular quality of service for the transmission of a stream of packets across a network.

Prior to transmission of a stream of packets, Intserv requires that an originating network component reserves resources in each router through which the stream of packets will pass. This resource reservation, usually requested using RSVP (Resource Reservation Protocol), ensures that each router in the path has the necessary resources to guarantee transmission of the packet stream at a particular QoS prior to transmission of the packet stream. However, the IntServ system does not scale easily, since it quickly becomes difficult for the network components to manage the reservations.

An alternative approach is the differentiated services, Diffserv, computer networking architecture enables the network to classify the traffic into one of a specified and predetermined number of traffic classes. A differentiated services, DS, field is populated in each packet transmitted across the network and the field indicates to the network the quality of service, QoS, that is to be provided to that packet in its transmission between network components. The DiffServ model can be used to provide low-latency transmission of critical network traffic, such as streaming packets or voice-over-IP packets, across a network. Packets not marked with a prioritised packet code, such as email and web traffic, can be transmitted when the network components have capacity to do so.

According to one aspect, there is provided a method of managing a plurality of QoS models for traffic flows in a network, the method comprising:
storing the plurality of QoS models;
analysing at least one of the plurality of QoS models to determine whether the at least one QoS model satisfies a suitability test;
selecting one or more QoS model from the plurality of QoS models based on the analysis offering the one or more selected QoS models to a client for use with a traffic flow in the network.

A network implementing flexible and adaptable QoS models can be provided, in particular by developing the DiffServ Classes of Service model into a system of multiple time-variant QoS models that are discovered dynamically and can also include softer policy-related routing options, such as network resilience, energy usage and cost. However, such a system can result in a single network holding a large number of QoS models at a single time. By way of non-limiting example, some of these can be internal and layered over other QoS models. Other models might not be suitable for a given client request if they do not meet the client's mandatory QoS request. Some models might not suit network policy at a given time for a given client. It might therefore be unnecessary or indeed inappropriate to expose all the available QoS options to a client. The present system and method therefore enables filtering to take place in deciding which QoS options should be exposed to a single client request at a specific time. This can be implemented to prune the number of options the client has to evaluate to decide the best QoS option for the given traffic by offering only selected QoS models or options to the client.

Optionally, the method further comprises analysing at least two, optionally each, of the plurality of QoS models to determine whether the at least two, or each, QoS model satisfies the suitability test. While it is desirable in some implementations to offer only a single QoS model to a requesting client, analysis of multiple QoS models by the network can enable the network to offer a plurality of QoS model options to a requesting client.

The method may further include receiving a query from a client requesting reservation of network resources for a traffic flow, preferably wherein the query is received prior to the step of analysing.

The query from the client optionally specifies at least one QoS metric for the traffic flow. The QoS metric may include a QoS Desired, QoS_D object, including parameters such as data rate, bucket size, peak rate, minimum policed unit and maximum packet size. The QoS metric may further include a min_QoS object that specifies minimum thresholds of traffic treatment that the client expects.

Optionally, the analysis is based on the query received from the client, for example based on an identifier of the client or an identifier of the source or destination of the traffic flow. Hence the analysis may be client-dependent and/or traffic-flow dependent which can enable the analysis to take into account factors such as past preferences or behaviour of the client, and expected attributes of the traffic flow as described in more detail below.

Optionally, the analysis is based on the at least one QoS metric specified in the query.

In some embodiments, the analysis is time-dependent or is dependent on conditions in at least a portion of the network. Hence the analysis can take into account the time of day and/or day of the week that the query is received. This can assist for example in predicting expected traffic capacity on the network, or on a portion of the network, at a particular time and can also add to the assessment of the expected characteristics of the traffic flow for which a request has been made, for example a query may correspond to an equivalent query sent by the same client at the same time in the previous week. Furthermore, the analysis can take into account factors such as network load in particular on different routes or different topological areas of the network and avoid further burdening congested network regions.

Optionally, the method further comprises ordering the selected QoS models prior to offering the selected models to the client. Ordering, prioritising or ranking the selected models can provide the network with further influence or control over the QoS model selected by a client following a query. In particular, the client may be configured to consider the models in order and select the first appropriate model offered by the network.

The method may further include receiving a response message from the client to request reservation of network resources based on a QoS model selected from the offered QoS models.

Each QoS model may have a plurality of associated parameters, optionally the parameters comprise at least one of jitter, loss, delay and resilience.

Optionally, the method further comprises deleting QoS models that do not satisfy the suitability test. For example, if a QoS model is not deemed to be suitable over an extended period, such as throughout a period of a week, or is not deemed to be suitable for any one of a plurality of client requests, the QoS model can be deleted from the store or marked as no longer active. This can provide a mechanism to reduce the number of QoS models that the network needs to store to avoid a build-up in number of models over time. However, in an alternative embodiment, a separate process may be used to prune QoS models from the store.

In some embodiments, the analysis is based on at least one of:
- a characteristic of the or each QoS model
- a characteristic of the client
- a characteristic of a query received from the client requesting reservation of network resources for the traffic flow
- a characteristic of the network or an operator of the network Further details of each of these factors and how they may be applied to influence the analysis is set out below. The skilled person will appreciate that more than one, optionally all, of these characteristics may be taken into account as part of the analysis and that the analysis may take the characteristics into account in any order. In particular, as described in more detail below, the order in which the characteristics are taken into account in the analysis can be varied in order to make the analysis more efficient, for example by excluding from the analysis at an early stage large numbers of QoS models that, for example, will never be appropriate for a particular client.

A plurality of routes is usually associated with each QoS model, wherein each route associated with a QoS model is capable of carrying a traffic flow using QoS parameters corresponding to those of the QoS model. Once a QoS model has been selected, any one of the routes may be used to transmit the traffic flow through the network.

In the methods described above, both QoS models developed based on policy considerations and QoS models developed based on performance considerations can be taken into account.

In one embodiment, the analysis is based on a characteristic of the or each QoS model and the analysis comprises determining a measure of stability of the QoS model over time. Stability may be considered to be a measure of the length of time over which a QoS model is expected to remain within range of its advertised QoS parameters. Alternatively, but equivalently, stability may be considered as a measure of the likelihood or probability of a QoS model straying away from the advertised QoS parameters within a fixed time period.

Optionally, determining a measure of stability comprises: identifying a plurality of routes for traffic flow through the network having parameters with values corresponding with values of parameters associated with the QoS model at a time, t; and determining, for each of the plurality of routes, a duration T over which the values of the parameters for the route are expected to continue to correspond with the values of the parameters associated with the QoS model. With results for multiple routes within the QoS model aggregated, this can provide an indication of the length of time during which the QoS model as a whole will remain stable.

Alternatively, or as an additional measure, determining a measure of stability comprises: identifying a plurality of routes for traffic flow through the network having parameters corresponding to parameters associated with the QoS model at a time, t; and determining a number of routes, n, for which the parameters are expected to correspond with the parameters of the QoS model throughout time t+T. This provides an alternative or additional mechanism for determining a measure of stability of the QoS model as a whole.

Optionally, a parameter associated with the QoS model has a range of values and the corresponding parameter of a route is considered to correspond with the parameter of the QoS model if the value of the route parameter remains within the range of values.

Alternatively, in particular for a different parameter, a parameter associated with the QoS model comprises a parameters each having a value and wherein the corresponding parameter of a route is considered to correspond with the parameter of the QoS model if the value of the parameter of the route remains within 20%, preferably within 10%, of the value of the corresponding parameter in the QoS model. As the skilled person will appreciate, some parameter associated with a QoS model may be assessed against a range of values for that parameter and other parameters may be assessed based on how close they remain to a fixed value.

Values of the parameters associated with the routes for traffic flow through the network may be recalculated periodically. Different routes can then be assigned to different QoS models periodically, based on the recalculation.

Optionally, the analysis is based on characteristics of the or each QoS model and the analysis comprises determining a measure of deviation of the QoS model over time. The deviation of a QoS model may be determined alternatively or additionally to the stability of a QoS model. Deviation provides a measure of how far from QoS parameters a model is likely to stray in a particular time period.

In particular, determining a measure of deviation of the QoS model comprises determining a measure of the extent to which parameters associated with each route for traffic flow through the network deviate from parameters associated with the QoS model within a predetermined time period. The measure of deviation may be presented as an aggregate figure calculated based on the deviation of each QoS parameter. However, the deviation of particular parameters within the QoS model may also be determined and presented separately to the analysis step.

Optionally, the stability or deviation of a QoS model is based on measures of stability or deviation of each of a plurality of routes associated with the QoS model.

In some embodiments, the analysis is based on one or more QoS parameters in a query received from the client, optionally wherein the parameters comprise at least one of jitter, loss, delay and resilience. Parameters received from the client may therefore form the basis of the analysis of the suitability of particular QoS models. In particular, the analysis may include assessing how closely the parameters of each available QoS model match the parameters defined by the client in the query.

Optionally, the analysis is based on characteristics of the client or traffic flow, wherein the characteristics include at least one of: past behaviour of the client, for example the timing and type of past requests; past preferences of the client or of a population of clients connected to the network, for example previous QoS models selected by the client or client population; past impact of traffic from the client on the network, in particular the extent to which previous traffic flows from a particular client have remained within the bounds of QoS parameters selected by the client to handle those traffic flows; the expected traffic type within the traffic flow; the client type.

The characteristics of the client or traffic flow can be determined based on the time of day or the time of week. Hence the analysis may be time-varying.

Optionally, the method further comprises analysing and profiling a client query based on at least one of: a traffic flow source, a traffic flow destination, a traffic flow traffic type, requested QoS parameters in the query, application type for the application originating the traffic flow, time of day, time of week, an indicator of the client type.

Past behaviour of a client can include a measure of the likelihood of deviation of the traffic flow from traffic flow characteristics sent by the client in a query for the traffic flow.

Optionally, the analysis is based on characteristics of the network or an operator of the network and the analysis comprises assessing the one or more QoS models against criteria defined by the network operator.

The criteria defined by the network operator may include one or more of: a cost associated with the QoS model; a maximum threshold on the number of offered models; maximum performance boundaries which may be in place for specific clients; revenue; time of the query; and network load at a particular time or in a particular portion of the network.

According to further aspects, there are provided apparatus, a system, a computer readable medium or computer program product comprising software code adapted, when executed on a data processing apparatus, to perform any method as set out herein. Any feature in one aspect may be applied to other aspects, in any appropriate combination. In particular, method aspects may be applied to apparatus and computer program aspects, and vice versa.

Furthermore, features implemented in hardware may generally be implemented in software, and vice versa. Any reference to software and hardware features herein should be construed accordingly.

BRIEF DESCRIPTION OF THE FIGURES

Embodiments will be described in more detail with reference to the figures in which.

DETAILED DESCRIPTION OF EXAMPLE EMBODIMENTS OF THE INVENTION

Figure 1:
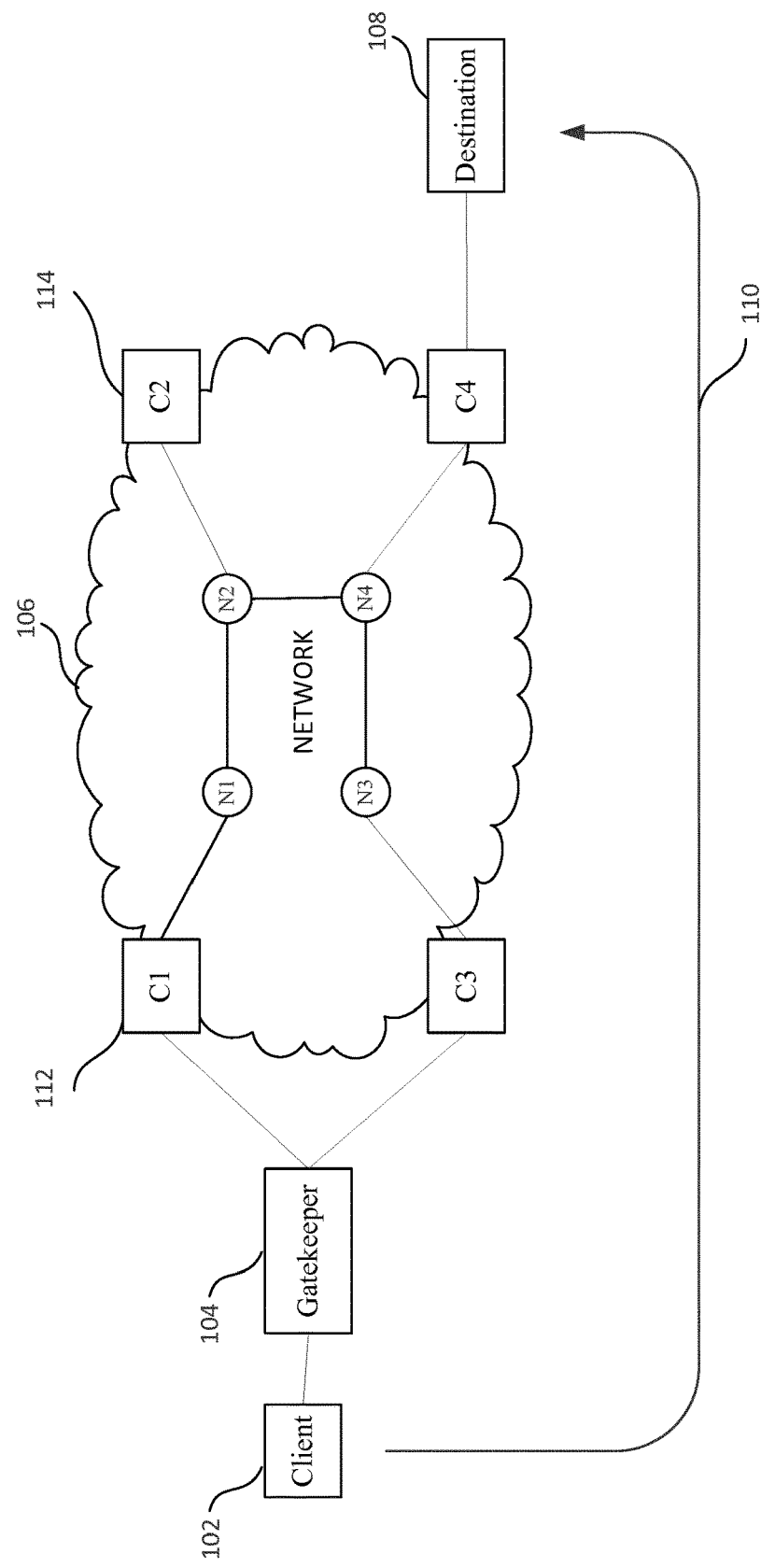
FIG. 1 is a schematic diagram of a network in which the systems and methods described herein may be implemented.

FIG. 1 illustrates a typical scenario in which a client 102 wishes to send a data flow to a given destination 108. The data flow is conceptually represented by arrow 110. Note that the terms "client" and "destination" are used merely to refer to the originator and recipient of the data flow respectively, such that the client is in the role of acquiring and consuming network resources, and do not imply a client/server type relationship. For example, the client could be a media streaming system and the destination could be a user device such as a media player.

The data flow is to be carried across a network 106, which includes a number of interconnected edge nodes C1-C4 and internal nodes N1-N4 (the number of nodes and interconnections depicted are chosen purely for example purposes). The network can thus provide various routes between pairs of edge devices, which can carry data flows, such as C1-N1-N2-C2, C1-N1-N2-N4-C4 etc. Each of these routes may have different performance characteristics, for example in terms of packet loss or delay.

The network is configured to provide data transmission in accordance with various distinct Quality of Service (QoS) models. Each QoS model in effect defines a Class of Service (CoS) that may be applied to traffic transported on the network. QoS models define bounds on various QoS metrics, such as packet loss. For example, one QoS model may define a particular maximum value for packet loss whilst another may specify a maximum packet delay. A single model may also combine multiple QoS metrics.

The network is configured to provide data transmission in accordance with various distinct Quality of Service (QoS) models. Each QoS model in effect defines a Class of Service (CoS) that may be applied to traffic transported on the network. QoS models define bounds on various QoS metrics, such as packet loss. For example, one QoS model may define a particular maximum value for packet loss whilst another may specify a maximum packet delay. A single model may also combine multiple QoS metrics.

In a simple example, the available QoS models may be predefined and largely fixed. For example, the network may provide a standard set of DiffServ classes of service such as Default PHB (typically best-effort traffic), Expedited Forwarding (EF) PHB (low-loss, low-latency traffic) and Assured Forwarding (AF) PHB (where PHB denotes per-hop-behaviour). However, preferred embodiments operate in the context of a system which monitors performance characteristics of the network and dynamically identifies classes of service that the network can support. This is based on an iterative learning process, in which various metrics are measured for actual flows traversing the network. For example, a given flow may be associated with a performance metric vector $p=<m\_1, m\_2, \ldots m\_n>$. Each metric corresponds to a different feature of the flow (e.g. packet latency, packet loss, jitter etc.)

A learning algorithm then performs a clustering analysis on the measured metric vectors to identify representative metric vectors that indicate distinct network behaviours (these are referred to as prototypes). The representative metric vectors then form the basis of a dynamic set of QoS models that can be made available for use. For example, if the clustering algorithm identifies a number of flows that achieve similar levels of packet loss and similar levels of packet latency, a QoS model can be defined specifying the given loss and latency levels (e.g. as bounded ranges, or just upper limits). This QoS model can be made available for use by future packet flows, since the system knows from the observed prior behaviour that the network can support traffic with those characteristics.

When "learning" a QoS model, the system keeps a record of all routes that support the model (i.e. the routes carrying the data flows which were the basis for the model). Thus, in addition to the model definitions themselves, the learning process produces a mapping that maps QoS models to routes. For example, a low packet loss QoS model may be associated with route C1-N1-N2-N4-C4, whilst a low packet delay model may be associated with route C3-N3-N4-C4. Later, when routing a data flow tagged for a given Class of Service corresponding to one of the QoS models, the network (e.g. the gatekeeper) selects a route associated with that QoS model to carry the data flow.

Referring back to FIG. 1, the learning algorithm is implemented in a QoS learning module 116, which may be part of the gatekeeper 104 or may be implemented separately, e.g. in a dedicated server. In a preferred embodiment, the QoS learning module 116 continues to monitor data flows in the network, and repeats the described learning process at periodic intervals. As a result the set of available QoS models may evolve over time, adapting to resource availability and demand in the network. However, such a dynamic system can make it more difficult for clients wishing to reserve resources for data flows to know what performance characteristics can be supported by the network at any given time. Furthermore, it may be the case that no single QoS model accurately represents the service characteristics desired by the client at that time.

In this way, a dynamic QoS model may be provided in which the network generates one or more route options that meet particular QoS requirements and hence provides differentiated classes of service, CoS. The network, optionally in conjunction with the requesting or originating client device, can then determine the CoS to use for particular network traffic and select an appropriate route or routes.

In a first implementation, traffic routes are generated and profiled by network components in order to offer particular CoS to service providers and client devices. These traffic routes, and the associated CoS that are offered, change over time due to factors such as network congestion, availability of nodes within the network and soft-routing policies such as the energy-impact or cost of particular routes.

In a further implementation, the client may also interact with a gatekeeper entity in order to influence the available routes and selected CoS. The purpose of this interaction is to:
1) Enable a client to query the network about currently available QoS models in the dynamic QoS environment (QUERY message)
2) Enable the network to respond with currently available QoS models, performance-driven and optionally also relating to softer routing features, and communicate some of the properties associated with a given model (RESPONSE message)
3) Enable the client to query the response and/or respond with one or more QoS models it desires which can be a mixture of performance driven models and policy-based models (RESERVE message)
4) Enable the network to establish an order of importance for each of those models
5) Enable the network to determine the best possible route to the destination given the priorities communicated by the client
6) Enable the network to mandate policies that are considered important and introduce priorities of its own in choice of route A signalling exchange for the negotiation process is illustrated in overview in FIG. 3.

The exchange starts in step 302 with the client 102 sending a query to the gatekeeper 104, specifying one or more requirements for the data flow. The requirements are specified in terms of one or more QoS metrics. In step 304, the gatekeeper identifies QoS models matching the identified requirements, and provides information about the matching models in a response to the client (step 306). If required, the query and response may be repeated one or more times (steps 308, 310, 312), for example based on revised requirements. In step 314, the client sends a reservation message, identifying one or more of the available QoS models as the basis for a resource reservation. In step 316, the gatekeeper identifies and reserves (if possible) network resources for the data flow based on the selected QoS model(s). This may involve identifying suitable network routes and allocating bandwidth on those routes. The gatekeeper also allocates a distinct CoS identifier for the data flow, representing the negotiated QoS metrics and allocated resources. In step 318, the gatekeeper sends a response indicating the allocated resources and CoS identifier.

The CoS identifier (e.g. in the form of a DSCP as described herein) is subsequently used by the client to label traffic for the data flow. The gatekeeper or another network component (e.g. edge router) receiving data packets for the flow labelled with the CoS identifier, can then identify the agreed QoS metrics and/or allocated resources for the packets from the CoS identifier and can process and route them accordingly.

Described below is a series of three tests that can be used to determine the suitability of a model for a client request at a specific time. Typically, these tests are applied by a gatekeeper 104 in response to a query from a client 102, however, the skilled person will appreciate that the tests may equally be implemented by another network component, which may be a dedicated network node. Furthermore, as will be appreciated by the skilled person, any single test or combination of two or more tests may be applied within an implementation in any order and different numbers and combinations of the tests may be used within a particular network at different times.

Factors that are taken into account can include one or more of:
the performance of one or more currently available QoS models (using one or more factors such as forecasted stability, confidence in adherence to QoS model);
the contents of the initial request (for example, contained in the Initiator QSPEC of the QoS NSLP message);
the nature of the client (their historical behaviour in both QoS models chosen for types of traffic as well as the impact of such choices on the network itself); and
policies from the operator.

The evaluation can be categorised into three stages or tests:
1) Model-related tests
2) Client-related tests
3) Operator-related tests As noted above, there is no prescribed order to these stages and any subset of these can be chosen for a given embodiment. In a particular, comprehensive embodiment, however, a model must pass all three sets of tests before being offered to a client. Each of the tests or stages of evaluation is described in more detail below before a worked example describes a particular implementation in more detail.

Model-Related Tests

A model-related test can be categorised into two parts: the first relates to stability of a QoS model over time, the second relates to deviation of the routes from the QoS model. If a QoS model is represented by cluster members centred around a cluster centre, where the cluster centre is the model specification itself and the cluster members are the routes that have been considered to exhibit performance 'close' to the cluster centre, an imaginary tunnel can be drawn in the third dimension representing time.

Figure 2:
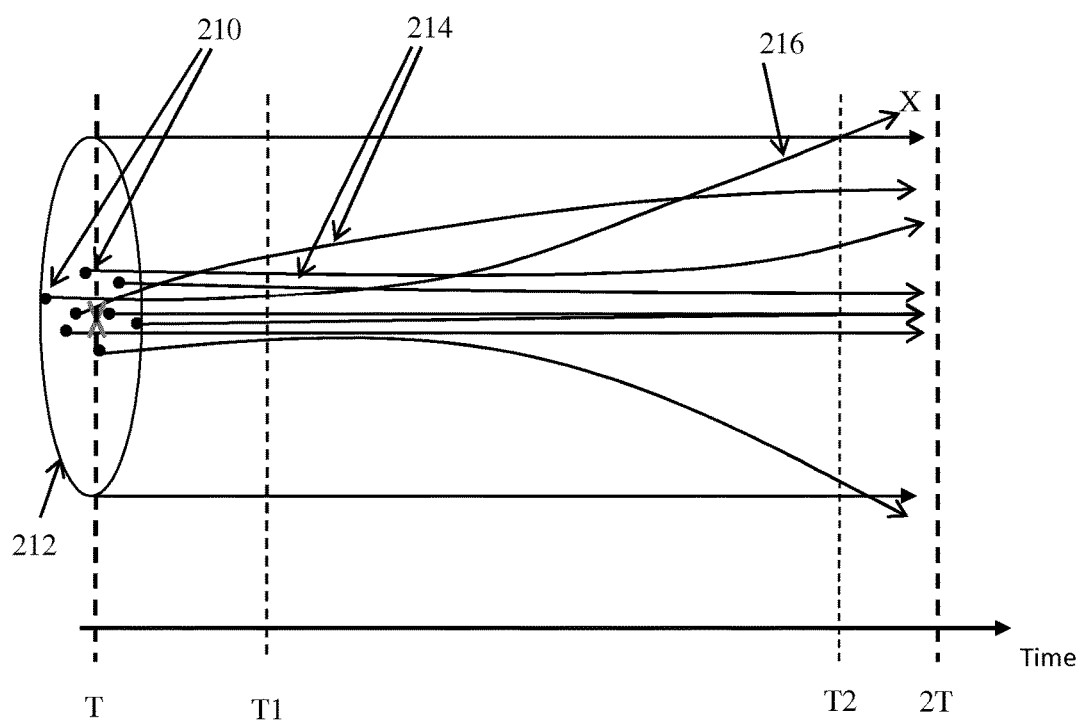
FIG. 2 is a schematic diagram of the development of a number of QoS models over time.

FIG. 2 shows a group of routes, represented as dots on the left 210, around the cluster centre represented as a cross, which has been formed at time T when the principal learning component discovers this QoS model (T represents the First iteration of principal learning component and Time of cluster formation). The cluster in this example has been made based on two dimensions, hence the ellipse 212 within which the cluster members can lie and still be classified with the cluster centre. The circular two dimensional space where the routes lie has been rotated around the cluster centre to its side to add a third dimension of time in the horizontal axis. The performance of each particular route is represented by a line 214 showing the trajectory of its behaviour as it evolves over time and it can be seen that some routes deviate from the cluster centre, i.e. their distance to the cluster centre increases with time. In fact, it is evident that route X 216 breaches the acceptable outer boundary of this cluster, and hence the limit of acceptable QoS, at time T2 which is not identified by the principal learning component until time 2T when the next iteration of the principal learning component is executed to re-discover the next set of QoS models. At the time of the admission request, T1, the gatekeeper can forecast the behaviour of route X 216. It can determine both a forecast the duration for which route X is likely to remain within this cluster as well as the extent of deviation until this time T2. The conformance of a cluster member (route) to its cluster over time, in terms of distance to cluster centre and when this becomes unacceptable, is referred to as route stability.

Route stability is forecast for the routes within a QoS model collectively to determine when the model is no longer suitable to be offered as an option. A model only qualifies this test if it is deemed to be stable for a period of time following the session request. This period of time can be a set duration or dependent on the duration of the session (or aggregate of sessions), if known.

Figure 3:
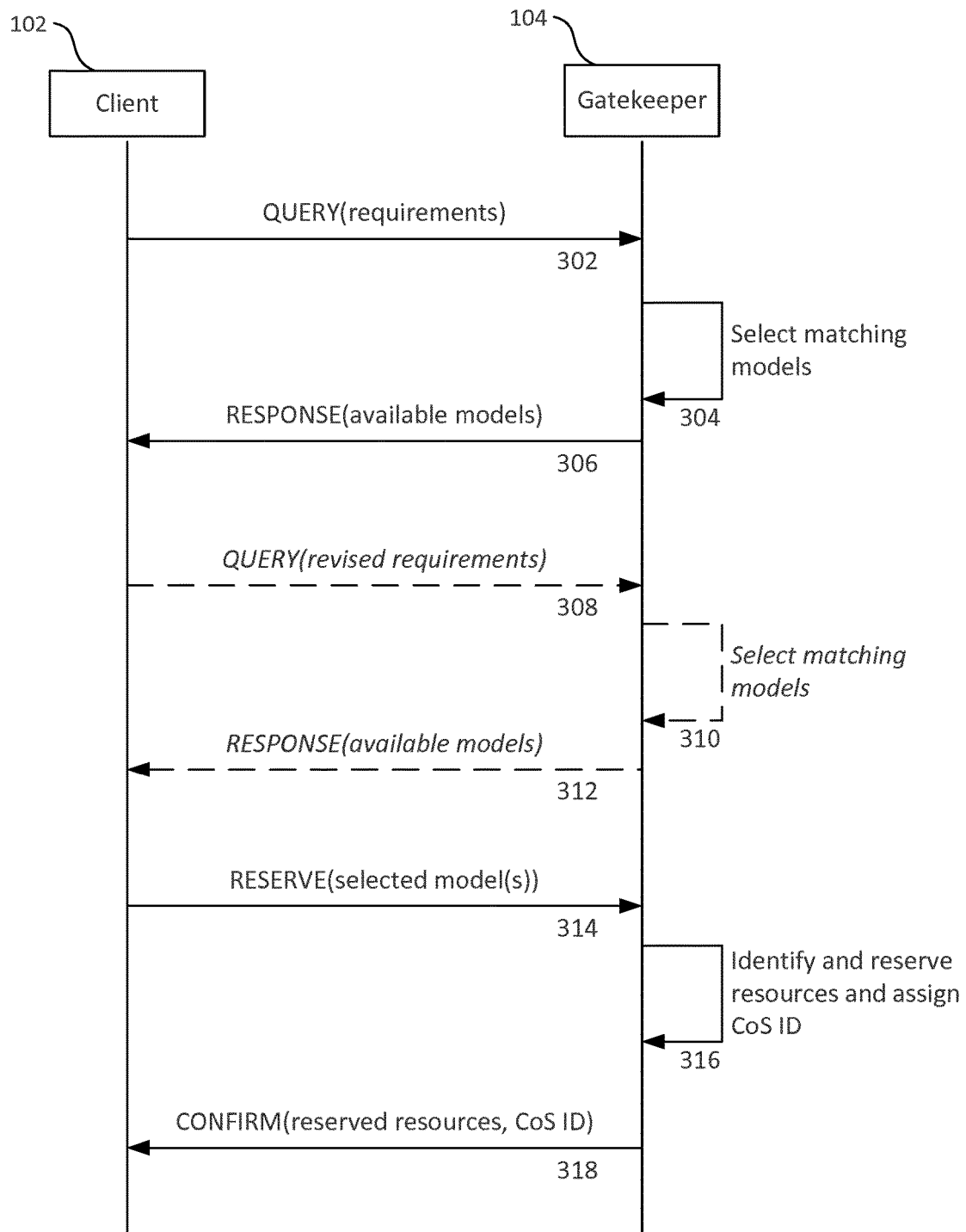
FIG. 3 illustrates a signalling procedure according to one embodiment.

With reference to FIG. 3, in one implementation, the client 102 can choose a subset of these bands in a RESERVE message 314 to specify the desired band of performance within the QoS model. This further band specification takes place in the RESERVE message, after the initial RESPONSE offer 306 of QoS models has been made. Since the system relates to generating the initial RESPONSE 306 message following the first QUERY 302 message from the client, the specification of desired bands of performance within the chosen QoS model is not yet known by the gatekeeper 104 and therefore the stability of a given QoS model being offered can potentially only be done over the entire model itself and all the routes that support this model rather than over a desired band within the overall model. Optionally, further stability tests might be undertaken in a similar fashion once the client responds with a more granular band of performance within the QoS model in later stages of negotiation, for example as part of the RESERVE 314 message or in further QUERY 308 messages.

Client-Related Tests

Tests may alternatively, or additionally, be implemented to prune QoS models to offer to a client based on client behaviour itself. This can include either or both of two aspects.

The first is about profiling a client's behaviour in the past and weighting the available QoS models according to models they might prefer, optionally further taking into account the circumstances of admission request. For example, a client might choose to send different types of traffic at different times of day/week. Therefore, it might be possible to discover this periodicity over time and offer QoS models that relate to the type of expected traffic at that time. Information about incoming traffic might also be known in advance and can be used to filter out QoS models that do not support expected traffic features. The client profiling aspect can be done at any granularity. For example, the operator can choose to profile requests only across time and not by client type. This results in the operator offering 'popular' QoS models to all clients irrespective of specific client behaviour. Further features can be added to the profiling as well. Historical requests can be profiled in terms of type of traffic and desired QoS features in initial QSPEC (an object carrying QoS Signalling Policy, QSP, specific information, which may be sent as part of the QUERY 316 message), destination and application type as well as time of day/week. The client itself can be part of a larger group of similar clients which therefore exhibit similar behaviour to each other. The focus at this stage is to determine what models best suit the current conditions for the specific client, and the more features and patterns discovered, the better the pruning will be. Whilst some of these features that can influence client behaviour in a specific instance are suggested below, further implementations can take into account other known behaviour or perform a feature selection step in advance to determine which features characterise client behaviour at a given time and therefore improve the selection of models for a specific client request.

The second testing aspect relates to determining the impact of a client on the network in the past in a 'what-if' type of analysis. The network can profile a client (or aggregate) according to the likelihood of adherence to initial admission request over the course of the session. A client that has a higher likelihood of exceeding the initial request can be treated in one of two ways. The first is to not offer QoS models where the client can cause detriment beyond acceptable limits to other clients using the same model or sharing the same route. The second is to offer a QoS model but limit the bands within to prevent such detriment to other services. For example, if QoS NSLP (Next Steps in Signalling, NSIS, Signalling Layer Protocol) is being used, the incoming request, QUERY 316, will have in its Initiator QSPEC a list of features about the incoming traffic. If QoS negotiation takes place, the initial QSPEC can be updated in the RESERVE 332 message following negotiation. Information in the QSPEC object can include data rate, peak rate, bucket size, minimum policed unit of traffic and maximum packet size.

These features can be used to filter out QoS models that do not meet the required QoS features (if a min_QoS object is sent). Furthermore, this can be extended to record the initial request and corroborate it against actual performance once data transmission is complete, especially if the operator chooses to deliver out-of-contract packets when possible. This allows the operator to estimate the likelihood of deviation from the initial request from historical data. Once this is known, the operator can choose to use the 'worst case' scenario to estimate the impact on other services and limit the offering to the client if the impact is decided to be undesired. For instance, if a client is likely to exceed average data rate, a smaller throughput can be offered in a given QoS model to take into account potential deviations during transmission. Evidently, this depends on whether or not the resources are currently being shared for a given QoS model with other traffic, i.e. whether the route carries other traffic in the same or different CoS at the time of admission or over the course of data transmission. If a route is uncongested or the client is unlikely to breach initial requested QoS, network impact need not be taken into account.

Even if the client is unlikely to breach initial requested QoS, it is possible that in-contract data can still act to detriment existing services. This can be evaluated as well by correlating past requests to route behaviour after admission and determining the likelihood of detriment if admission is granted.

Offering minimum cost models can be done in two ways. The first is to offer the absolute minimum cost model without taking into account any QoS associated with the routes that support the low cost. This can be done if the client does not mandate any other metrics or if the network operator wishes to offer a model that is guaranteed to be lowest cost but does not offer performance in any way. This might be suitable for some types of traffic. The second is to take into account the specific QoS request from the client, if one is mandated using a min_QoS model, to determine minimum cost after filtering out routes that do not satisfy the min_QoS parameters. This can be done by sorting the routes according to performance first, applying the mandated QoS features to filter out routes that do not satisfy the requested performance and then sorting the remaining routes into ascending cost to offer the lowest cost route. In order to offer an appropriate minimum cost model, we can make min_QoS the first priority and compute the minimum cost after taking into account the QoS mandated by the client rather than simply offering the minimum cost model without taking into account the performance of the corresponding route(s). Nevertheless, the operator can still offer the minimum cost route irrespective of QoS performance as one of the other QoS model options.

Operator-Related Tests

The operator can specify a set of models that are always offered by default. For example, the operator can choose to offer classic DiffServ-related models with the DiffServ DSCP values in every service request. The operator can alternatively also offer the lowest cost model, with or without taking into account the QoS requested in the Initiator QSPEC object. A maximum threshold can be set on the number of QoS models offered in response to a single admission query. Alternatively, the operator can specify maximum performance boundaries within a given QoS model for specific clients depending on external factors such as a contractual agreement. Such boundaries of acceptable deviation from the QoS model are taken into account in the same way as described in the "Model Related Tests" section above.

Alternatively, an operator can choose to offer a set of models based on revenue. If two models offer similar performance, the operator can choose to offer the one that brings more revenue, or reduces the cost. The same logic can be extended to an entire set of models. The operator can choose to do this at certain times of day to maximise revenue at those times (either peak traffic or periods of low usage). The operator can also mandate policies and layer them into other QoS models. This can be done before the models are offered to the client with information about layered models in the feature specification, if desired, or alternatively after negotiation as described above.

Worked Example

The example set out below demonstrates some of the features of one implementation.

Note also that only some session requests might have pruned QoS models offered to them. Alternatively, this pruning mechanism can be done periodically at less granularity for a set of session requests that are prototypes representative of real-time requests and therefore pre-select a set of QoS models against a set of potential prototypes session requests. In such an embodiment, when a session request arrives in real-time, the gatekeeper must only determine which of the session prototypes the current session is most similar to and therefore offer the associated predetermined set of QoS models in response to this request without incurring computation on the fly and therefore a longer delay in responding to clients. Determining the set of prototype sessions can be done periodically by clustering client requests over a number of features when the principal learning component completes its iteration.

In the implementation set out below, we assume that such session prototyping has not been done and therefore, we describe how the invention responds to a single client request. This provides an accurate method of determining the optimal set of QoS models for a specific client request as it does not approximate the session to the session prototype and therefore introduce cause for errors. For the remainder of this example, we assume that the set of QoS models offered to the client is computed directly from the client request itself.

With reference to FIG. 1, consider a client request, sent using NSIS (QoS NSLP and GIST, General Internet Signaling Transport) to the gatekeeper 104 for a session S1 of throughput 5 Mbps from the client's IP address C1 112 to destination C2 114 and QoS parameters as follows: jitter=3 ms, Loss=0.1%, delay=25 ms. Assume that the client 102 makes this request at 11:00 AM. There might be other parameters that describe this session request as well, such as bucket size, burst rate, peak rate, maximum policed unit and minimum policed unit. Some of these features can be used for policing the session post-admission. The task for the gatekeeper 104 is now to determine which QoS models currently available would be best suited for this request. We have proposed three sets of tests to determine this result.

The first is model-related tests. This has to do with establishing whether a model is expected to be stable for a time in the future for its QoS offering. We therefore consider each available model and perform the following test. The degradation of QoS is assessed on a model-basis. Note that this component can be triggered potentially on a session-by-session basis as the admission requests arrive.

The performance prediction can be done on several levels of granularity:

On a per model basis,
on a per destination point and model basis, and
on a per route and model basis.

On any level of granularity a performance prediction provides a time-based estimation of the performance parameters jitter, loss and delay and an estimate of the amount of traffic that is likely to be assigned to at that time.

The simplest prediction model is to record the performance over a number of time intervals and then simply use them to predict the performance in the equivalent future time interval. For example, the operator could build a 24 hour model with hourly performance statistics. The values from each hourly slot would then become the predictions going forward, e.g. the recorded performance today between 14.00 and 15.00 will become the prediction for tomorrow's corresponding time slot. The values for each time slot get updated once every 24 hours. Such a type of model is appropriate for networks with regular traffic patterns and where the network operator is not worried about breaching performance of a model once and then making a decision if the model can be advertised again in the future. Such a model learns if a QoS model is expected to perform as expected and what the average demand would be for each time slot. For a time slot where the estimate shows that a model would not perform well it would subsequently no longer be advertised for this time period until the operator decides to withdraw the model altogether because it does not perform well enough in a sufficient number of time slots. Time slots that show a high demand for a model can be managed by changing the policy relating to which client gets offered which QoS model. Additionally, the gatekeeper can withdraw models in real-time if they are oversubscribed.

The information from such a predictive model can be stored in a predictive model features table PMF. The following table shows a peak demand for QoS Model ID P_1 on route R_1 at lunch time which results in slightly worse confidence profile compared to the time around midnight, where demand is low and performance is high. The QoS model still performs in an acceptable manner at lunch time, but the expected demand can prompt the network operator to not offer the QoS model to all clients at this time but implement some policy that restricts the offer to certain clients only.

| Route | Model ID | Time | Route Confidence Profile | Demand [Mb/s] |
|---|---|---|---|---|
| $R_1$ | 1 | 00.00 | (0.028, 0.0015, 0.2193) | 20 |
| | | ... | ... | ... |
| | | 12.00 | (0.035, 0.002, 0.2357) | 100 |
| | | ... | ... | ... |
| | | 23.00 | (0.0280, 0.0015, 0.2193) | 30 |
| ... | ... | | ... | ... |

The drawback of this method is that once a model has performed badly in a time slot, it will no longer be offered at this time and therefore data can no longer be collected about this model in this time slot. A more flexible predictive model would take different factors into account and try to predict future performance in dependence to a number of attributes like amount of traffic, type of traffic and traffic distribution in addition to the past performance of a QoS model. This way a QoS model can "recover". For example, the prediction could be that a model is not going to perform well in the next hour because of the current amount of traffic. However, the prediction for the same time slot next day can look different, because there may be less traffic at that time.

Such a predictive model $f$ can be built from historic data collected per QoS model and from network monitoring data using methods like regression analysis or neural networks, for example. The predictive model $f$ predicts a future confidence vector $\hat{c}_i$ for a QoS model $P_i$:

$$\hat{c}_i = f(p_i, c_i, T, F, B, C, \hat{C}, \ldots)$$

Where T is time distance we want to predict into the future, F is the number of traffic flows on the current route, B is the available bandwidth, C is the current throughput, and $\hat{C}$ is the expected future throughput, and there can be other variables describing the current traffic behaviour on the route such as rate of change of congestion (Explicit Congestion Notification markings on the route). Other data sources and features can also be considered in this analysis. The model $f$ has been built such that it predicts $\hat{c}_i$ at a certain time in the future, e.g. 1 hour ahead. If required, it is possible to build several predictive models for different time horizons. In this example, the predictive model is generic and can be applied to any route and any QoS model $P_i$ because it receives the QoS model parameters $p_i$ and $c_i$ as well as the current route conditions as input. If such a generic model is not accurate enough, it is possible to build predictive models per QoS model, per route or per QoS model/route combination etc. The expected future throughput $\hat{C}$, can be obtained from a dedicated predictive throughput model or from a historic profile, or it can be a projection of traffic to be admitted in order to predict the impact of this traffic. Additional parameters like maximum packet size, likelihood of clients to send more traffic than agreed etc. can also be used. The network operator will decide which factors are considered to have an impact on the performance of QoS models and include them into the predictive model.

The historic data used to build such a predictive model $f$, is the same data used for the clustering analysis plus additional data about the traffic conditions in the network collected at the same time as the data about individual flows. The predictive model is rebuilt in regular intervals, e.g. every 24 hours to take changes in network traffic into account.

Using this method, the network can refrain from offering models that are considered to be unstable in the near future and therefore not risk service degradation at a later stage. Some available models will be filtered out in this step. In the example below, model M7 is filtered out due to instability issues.

The second is client-related tests. In the embodiment, three sets of information are used for this step:
1) A repository of past requests from this client recording QoS features requested (potentially not just jitter, loss and delay).
2) The admission decision taken in the past in response to the QoS request. This also includes the QoS features agreed upon (following negotiation if applicable or as described by the published QoS model on the 'scoreboard').
3) A characterisation of the actual data sent by the client following admission.
4) Expected network conditions such as current/projected throughput for each of the CoS on offer.

We use this information as follows:
The first sub-component of this aspect is to determine whether or not there are any similar QoS models that can be proposed from the current set that also coincide with the client's past requests. Consider that this client has had 5 past requests as shown in the table below:

| Session ID | Source | Destination | Time of day | QoS features requested | QoS features used | ... |
|---|---|---|---|---|---|---|
| S2 | C1 | C2 | T1 = 10:00 | {J1, L1, D1} | {J1, L1, D1} | ... |
| S3 | C1 | C2 | T1 = 10:00 | {J1, L1, D1, R1} | {J1, L1, D1, R1} | ... |
| S4 | C1 | C3 | T2 = 16:00 | {J2, L2, D2, R1} | {J2, L2, D2, R1} | ... |
| S5 | C1 | C4 | T3 = 20:00 | {L3, E1} | {L3, E1} | ... |
| S6 | C1 | C2 | T4 = 12:00 | {J1, L1, D1, R1} | {J1, L1, D1, R1} | ... |
| ... | ... | ... | ... | ... | ... | ... |

It can be seen that the client has requested two sessions to C2, at two distinct times T1 (twice, perhaps on different days) and T4 with a set of QoS features characterised by jitter=J1, loss=L1, delay=D1, resilience=R1. The client has also made other requests to other destinations at different times and requested different QoS features including an energy-related feature of E1 in S5. Note that some of these features are softer policy-related. In this case, it is assumed that the client was granted what they had requested. This could be due to a successful negotiation or indeed because the client chose from a published scoreboard relating to the QoS models. Other features that characterise the client requests can also be recorded. The task undertaken based on this data is pattern mining and this is extensible for as many features as considered useful. Further steps in advance of this stage can be undertaken to determine which features best represent a client request and the operator might choose to include, for example, geographical location of destination.

If session S1 has an associated QoS request as described above, the similarity of S1 to the historical set of requests can be computed to determine which session it is closest to. A request can be represented as a set of numbers. Comparing requests can therefore be done by computing Euclidean vector distance between the current request and the past requests.

If there are missing components, this component can be left out from the comparison. One can also place a threshold on the minimum number of times a request must be made before it qualifies to be compared. Also, alternatively, the past history of requests need not be maintained in their entirety but only as an aggregation against a set of features that characterise the request. For example, the above request can be summarised further by time of day and filtered by number of requests of the same type so that fewer records are maintained of the past. Such alternatives are only about data management and are variations of the embodiments described herein.

Note that the operator can place as many restrictions in the comparison as necessary. For example, a client request might only be compared to other client requests to the same destination. Alternatively, a client request can only be compared to other requests based on similarity in QoS features, rather than source-destination combination. In the present example, source-destination combinations are not restricted, but a restriction is placed on QoS features being most similar and also time of day being within a specific window of 4 hours. This could be to take into account hourly variations in traffic type sent from a client entity. Using this comparison method, we find that S1 is most similar to requests S2, S3 and S6.

The system then looks at which QoS models were offered for S2, S3 and S6. One possible option is to choose {J1, L1, D1, R1} as well as {J1, L1, D1}. Alternatively, the QoS model with more features can be chosen. Alternatively, a pre-defined number of QoS models can be chosen, in decreasing order of session similarity to the current request. Assume that the system chooses up to three QoS models in decreasing order of session similarity and therefore, both of these QoS model features will be selected for the next step.

It will be understood that the QoS features {J1, L1, D1, R1} and {J1, L1, D1} were offered in the past, possibly as QoS models M1 and M2 respectively. It is possible that M1 and M2 do not exist at the current time and therefore, the next step is to determine which QoS models currently exist that can support QoS features {J1, L1, D1, R1} as well as {J1, L1, D1} previously offered by M1 and M2. Note that the agreed QoS models are taken into account rather than the client request because it is possible that client negotiation has taken place and therefore the agreed QoS model was considered to be the better option in the past and the session request was amended. It is also possible that the agreed model is different to the requested model because of stability concerns on behalf of the network for the requested model and therefore the agreed model was offered in preference instead. Therefore, it is preferable to compare previous QoS models offered to current QoS models available to determine the best suitable set of models for the current request rather than directly working from the requested features.

The task now is to determine which of the current QoS models are most similar to M1 and M2. This is once again done using vector similarity of features. In this case, the outcome of this step is that models M1 and M2 are most similar to a different set of models M3 and M4. Note that it is possible that more than one model is offered with each option. Therefore, M1 can be most similar to M3, M5 and M6 in decreasing similarity whereas M4 is most similar to M7 and M8 in equal similarity. Therefore, the operator can choose to offer any subset of M3, M5, M6, M7 and M8 in response to the client request S1.

The second sub-component of this test is to evaluate whether M3, M5, M6, M7 and M8 are likely to experience degradation as a consequence of admitting S1. This depends on determining the risk associated with the client and S1 and also the likelihood of this risk to impact the models.

The risk of a client to deviate from requested QoS behaviour can be calculated by observing the client's behaviour in the past and computing the number of times the client has sent more traffic than agreed and the average amount of extra traffic that was sent at those times. This profiling can be done at any level of granularity, e.g. Class of Service, application type (if available) and/or time of day. It can also take into account a number of traffic descriptors like peak data rate, maximum policed unit, burst size, etc. in addition to average throughput over session duration. The historic time period that is used for this computation is set by the network operator. The shorter this time period, the faster the network 'forgets' that a client has deviated from requested QoS behaviour. Alternatively, instead of comparing actual traffic with agreed traffic, the network can use the number of ECN (Explicit Congestion Notification) markings applied to the client source address to determine how often the client traffic has been marked as being likely to be dropped. Alternatively, the network can use other policing mechanisms already in place in order to determine how much traffic the client typically sends out-of-band—such policing is typically done at BRAS (Broadband Remote Access Server) elements.

In this example, the ratio of out-of-band traffic to in-band traffic is used as the metric that describes the extent of deviation from agreed SLAs (Service Level Agreements). The frequency of this occurrence in comparison to the total number of times the client has sent traffic of this profile is the probability of this breach occurring in the future. This then quantifies the extent of deviation as well as the likelihood of this happening for a specific client under the current conditions.

Assume that this client has been profiled in such a manner and it has been determined from historical behaviour that the client is 30% likely to send 20% more traffic than agreed at this traffic band of 5 Mbps.

In order to make a decision, we enhance the QoS model performance forecasting method used in the model-related test described above to determine if the QoS Model is likely to perform worse if the client is admitted. In order to make this prediction the predictive function $f$ that the PM (predictive model) uses to predict future QoS model performance is used with a set of inputs that take the current client request into account. The period that is predicted into the future can depend on what is known about the type of request and experience the network operator has with impact analysis. The inputs for $f$ are the same as for predicting model performance in general, but the inputs about expected traffic are modified with the details from the client request. If the prediction shows that the admitting the client leads to an unacceptable deterioration of the QoS model, this QoS model will not be offered to the client. The network operator decides what is deemed unacceptable, e.g. if the predicted performance would lie outside the agreed confidence interval for at least on component of the QoS model.

The prediction can be checked for a number of QoS models on route level or globally depending on the network operator's preferences and the compute power and time available to process these predictions. More finely grained predictions reduce the risk for the network operator, but will take more time and resources for the negotiation phase.

Consider model M6 as an example. Assume that according to the current prediction that does not yet take the traffic of the requesting client into account the performance of M6 is stable for 11:00 AM, i.e. it is predicted that it will operate within expected parameters (not more than 10% deviation from model prototype in any QoS component). The predicted performance confidence interval for M6 is (0.25, 0.01, 2).

The client asks for a throughput of 5 Mb/s and it has a likelihood of 30% to send 6 Mb/s as the PM knows from analysing past traffic from this source.

The predictive model $f$ can be used to predict the future confidence vector $\hat{c}_6$ for M6 assuming the traffic is admitted into the network:

$$\hat{c}_6 = f(p_6, c_6, T, F, B, C, \hat{C}, \ldots)$$

and $\hat{C}=6$ (=5+20%) is used and the likelihood to send more traffic as agreed and the expected amount of traffic that is not agreed are also provided as parameters (if $f$ is used to predict the QoS performance without considering a session to be admitted these two parameters are simply set to 0). T is the time we want to predict into the future and we apply $f$ three times with T=1, T=2 and T=3 to obtain a three hour prediction window.

Assume that $f$ returns (0.5, 0.01, 2) for 11:00. M6 has the prototype (3.0, 0.1, 25) and the predicted performance at 11:00 AM is now outside the acceptable deviation of 10%. Whilst M6 is expected to perform in a stable manner without taking into account S1, the new session has been deemed to cause an unacceptable detriment to M6. Therefore M6 will not be offered to this client request.

Note that it is also possible that the subset of currently available QoS models is done based on the projected stability of these models (model-related tests). Therefore, it is possible that only M3, M5 and M8 are considered stable and offered in response to the client and M7 is considered unstable and filtered out.

The third set of tests relate to operator preferences. This is a set of default models that are always offered. One of these models can be a lowest cost model. This is determined by sorting the cost model in ascending order of cost and determining which of the routes can support the desired QoS requested in the initial request. Alternatively, the lowest cost model can be offered without consideration of QoS performance desired. Note that the cost model can be time-dependent and therefore a different low cost route can be chosen at a different time for the same request. Choice of route and sorting of routes has been covered in an earlier invention. We only propose here to use the desired QoS performance in the initial request received for S1 to filter out routes that do not perform as desired and subsequently determine the lowest cost from the routes that do perform as desired. If the lowest cost model is offered as an option, then the cost value itself (or bands of cost vs. bands of QoS operation/time of day) can be signalled in the associated parameter information for the cost-related model.

Additionally, the operator can choose to offer, by default, models that are closest to classic DiffServ. These can be models M9 for EF and M10 for AFx in the current iteration of the principal learning component. Note that the same applies in a non-dynamic QoS environment. Such a system would in fact be simpler to implement as the offered models will not change over time. Stability of non-dynamic models can still be evaluated in the same way prescribed here and operator-related constraints can still be incorporated in the same way.

Therefore, the outcome of the evaluation is that models M3, M5, M8, M9 and M10 are offered in response to client request for S1 instead of a much larger and potentially less relevant set of QoS models without knowledge of client behaviour.

Note that the three sets of tests can be performed in any order. The task is to reach the smallest set of models as quickly as possible. If there are many unstable models, then this step can be performed first. If there are only a few client requests from the past, the client-related tests can be performed first. It is also possible to skip some of these tests entirely. For example, if no past client requests are recorded, recommendations of QoS models cannot be made and the other two tests take precedence. Alternatively, if no requests have been recorded from this client, requests of similar nature from similar clients can be used instead. Similarity to other clients can once again be determined based on a comparison of their requests to the current client's request in the local geographical region, time of day or indeed any set of characteristics that are considered to be representative of the clients' behaviour.

Figure 4:
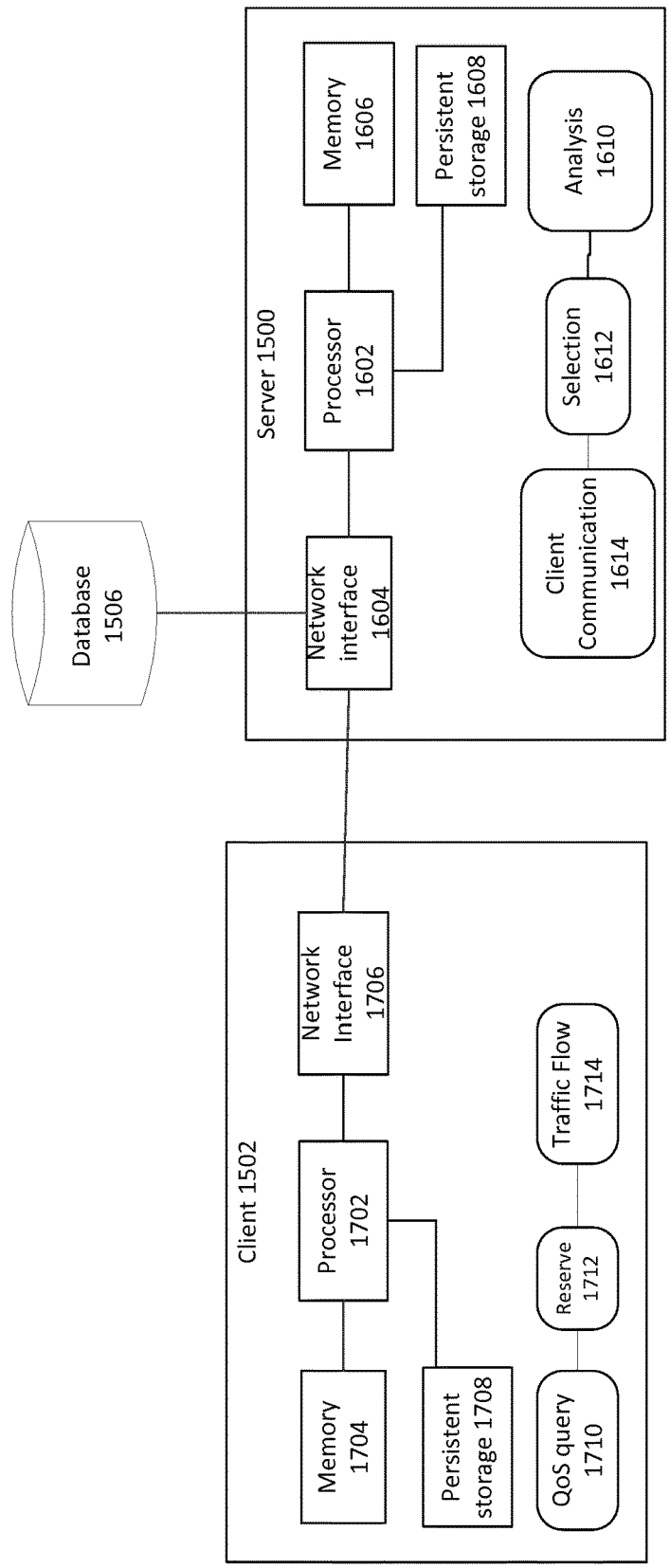
FIG. 4 is a schematic diagram of hardware that may be used to implement the analysis methods described herein according to one embodiment.

FIG. 4 illustrates hardware architecture that may be provided to implement the analysis described herein, which is illustrated as a server 1500. The server may be implemented as part of a gateway component in the network. The server includes one or more processors 1602 together with volatile/random access memory 1606 for storing temporary data and software code being executed.

A network interface 1604 is provided for communication with other system components (e.g. client, database 1506 and core network components) over one or more networks (e.g. Local or Wide Area Networks, including the Internet). The database 1506, which may be implemented within or external to the server 1500, may be used to store information such as QoS models and their associated parameters and data relating to the past preferences and behaviour of clients and the network.

Persistent storage 1608 (e.g. in the form of hard disk storage, optical storage and the like) persistently stores analysis software for performing the functions, including an analysis process 1610, a selection process 1612 and a process for communicating with a client 1614. The persistent storage also includes other server software and data (not shown), such as a server operating system.

The server will include other conventional hardware and software components as known to those skilled in the art, and the components are interconnected by a data bus (this may in practice consist of several distinct buses such as a memory bus and I/O bus).

A client device 1502 may also be provided, including one or more processors 1702 together with volatile/random access memory 1704 for storing temporary data and software code being executed.

A traffic flow for which the client is requesting a path through the network may originate at the client 1502 or may be received by the client via the network interface 1706. Communication is also provided to the server 1500 via the same or a separate network interface 1706 (but is illustrated herein as a single interface). The network interface communicates over one or more networks (e.g. Local or Wide Area Networks, including the Internet).

Persistent storage 1708 (e.g. in the form of hard disk storage, optical storage and the like) persistently stores software for performing the functions of the client, including a QoS query process 1710, a reserve process 1712 and a traffic flow management process 1714.

The client will include other conventional hardware and software components as known to those skilled in the art, and the components are interconnected by a data bus (this may in practice consist of several distinct buses such as a memory bus and I/O bus).

While a specific architecture is shown by way of example, any appropriate hardware/software architecture may be employed.

Furthermore, functional components indicated as separate may be combined and vice versa. For example, a database 1506 may be stored at the server 1500 (e.g. in persistent storage 1608) or may be provided as a separate database server. Furthermore, the functions of server 1500 or client 1502 may in practice be implemented by multiple separate server devices. The client 1502 may also store or have access to a database.

The invention claimed is:

1. A method of managing a plurality of QoS models for traffic flows in a network, the method comprising:
    storing the plurality of QoS models;
    analysing at least one of the plurality of QoS models to determine whether the at least one QoS model satisfies a suitability test, wherein the analysis is based on a characteristic of the or each QoS model and the analysis comprises determining a measure of stability of the QoS model over time; and wherein determining the measure of stability comprises: identifying a plurality of routes for traffic flow through the network having parameters with values corresponding with values of parameters associated with the QoS model at a time, t; and determining, for each of the plurality of routes, a duration T over which the values of the parameters for the route are expected to continue to correspond with the values of the parameters associated with the QoS model;
    selecting one or more QoS model from the plurality of QoS models based on the analysis; and
    offering the one or more selected QoS models to a client for use with a traffic flow in the network.

2. The method according to claim 1 further comprising receiving a query from a client requesting reservation of network resources for a traffic flow.

3. The method according to claim 2 wherein the query from the client specifies at least one QoS metric for the traffic flow.

4. The method according to claim 2 wherein the analysing is based on the query received from the client.

5. The method according to claim 1 further comprising receiving a response message from the client to reserve network resources based on a QoS model selected from the offered QoS models.

6. The method according to claim 1 wherein the analysis is based on at least one of:
    a characteristic of the or each QoS model;
    a characteristic of the client;
    a characteristic of a query received from the client requesting reservation of network resources for the traffic flow; and
    a characteristic of the network or an operator of the network.

7. The method according to claim 1 wherein a plurality of routes is associated with each QoS model, wherein each route associated with a QoS model is capable of carrying a traffic flow using QoS parameters corresponding to those of the QoS model.

8. The method according to claim 1 wherein QoS models developed based on policy considerations and QoS models developed based on performance considerations are taken into account.

9. The method according to claim 1 wherein determining the measure of stability comprises:
    identifying a plurality of routes for traffic flow through the network having parameters corresponding to parameters associated with the QoS model at the time, t; and
    determining a number of routes, n, for which the parameters are expected to correspond with the parameters of the QoS model throughout time t+T.

10. The method according to claim 1 wherein the analysis is based on characteristics of the client or traffic flow, wherein the characteristics include at least one of:
    past behaviour of the client;
    past preferences of the client or of a population of clients connected to the network;
    past impact of traffic from the client on the network;
    the expected traffic type within the traffic flow; and
    the client type.

11. A non-transitory computer readable medium comprising software code adapted, when executed on a data processing apparatus, to perform the method as set out in claim 1.

12. The method according to claim 4 wherein the analysing is based on an identifier of the client or an identifier of the source or destination of the traffic flow.

13. An apparatus for managing a plurality of QoS models for traffic flows in a network, the apparatus comprising:
    a processor and associated memory storing instructions for execution by the processor such that the apparatus is at least configured to:
    store the plurality of QoS models;
    analyze at least one of the plurality of QoS models to determine whether the at least one QoS model satisfies a suitability test, wherein the analysis is based on a characteristic of the or each QoS model and the analysis comprises a determination of a measure of stability of the QoS model over time; and wherein the determination of the measure of stability comprises: identification of a plurality of routes for traffic flow through the network having parameters with values corresponding with values of parameters associated with the QoS model at a time, t; and a determination of, for each of the plurality of routes, a duration T over which the values of the parameters for the route are expected to continue to correspond with the values of the parameters associated with the QoS model;

select one or more QoS model from the plurality of QoS models based on the analysis; and offer the one or more selected QoS models to a client for use with a traffic flow in the network.

14. The apparatus according to claim 13 wherein the apparatus is further configured to receive a query from a client requesting reservation of network resources for a traffic flow.

15. The apparatus according to claim 14 wherein the query from the client specifies at least one QoS metric for the traffic flow.

16. The apparatus according to claim 14 wherein the analysis is based on the query received from the client, and based on an identifier of the client or an identifier of the source or destination of the traffic flow.

17. The apparatus according to claim 13 wherein the apparatus is further configured to receive a response message from the client to reserve network resources based on a QoS model selected from the offered QoS models.

18. The apparatus according to claim 13 wherein a plurality of routes is associated with each QoS model, wherein each route associated with a QoS model is capable of carrying a traffic flow using QoS parameters corresponding to those of the QoS model.

19. An apparatus for managing a plurality of QoS models for traffic flows in a network, the apparatus comprising:

a processor and associated memory storing instructions for execution by the processor such that the apparatus is at least configured to:

store the plurality of QoS models;

analyze at least one of the plurality of QoS models to determine whether the at least one QoS model satisfies a suitability test, wherein the analysis is based on a characteristic of the or each QoS model and the analysis comprises a determination of a measure of stability of the QoS model over time; and wherein the determination of the measure of stability comprises: identification of a plurality of routes for traffic flow through the network having parameters corresponding to parameters associated with the QoS model at a time, t; and a determination of a number of routes, n, for which the parameters are expected to correspond with the parameters of the QoS model throughout time t+T;

select one or more QoS model from the plurality of QoS models based on the analysis;

offer the one or more selected QoS models to a client for use with a traffic flow in the network.

20. A method of managing a plurality of QoS models for traffic flows in a network, the method comprising:

storing the plurality of QoS models;

analysing at least one of the plurality of QoS models to determine whether the at least one QoS model satisfies a suitability test, wherein the analysis is based on a characteristic of the or each QoS model and the analysis comprises determining a measure of stability of the QoS model over time; and wherein determining the measure of stability comprises: identifying a plurality of routes for traffic flow through the network having parameters corresponding to parameters associated with the QoS model at a time, t; and determining a number of routes, n, for which the parameters are expected to correspond with the parameters of the QoS model throughout time t+T;

selecting one or more QoS model from the plurality of QoS models based on the analysis; and offering the one or more selected QoS models to a client for use with a traffic flow in the network.

* * * * *